United States Patent
Kim

(10) Patent No.: US 12,261,339 B2
(45) Date of Patent: Mar. 25, 2025

(54) FUEL CELL MOUNTING SYSTEM

(71) Applicants: Hyundai Motor Company, Seoul (KR); Kia Corporation, Seoul (KR)

(72) Inventor: Yong Lip Kim, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 426 days.

(21) Appl. No.: 17/397,152

(22) Filed: Aug. 9, 2021

(65) Prior Publication Data

US 2022/0181670 A1  Jun. 9, 2022

(30) Foreign Application Priority Data

Dec. 3, 2020  (KR) .................. 10-2020-0167361

(51) Int. Cl.
  *H01M 8/2475*  (2016.01)
  *H01M 8/04007*  (2016.01)

(52) U.S. Cl.
  CPC ..... *H01M 8/2475* (2013.01); *H01M 8/04007* (2013.01)

(58) Field of Classification Search
  CPC .......... H01M 8/2475; H01M 8/04007; H01M 8/247; H01M 2250/20
  See application file for complete search history.

(56) References Cited

U.S. PATENT DOCUMENTS

| | | | |
|---|---|---|---|
| 9,300,001 B2* | 3/2016 | Naito | H01M 8/248 |
| 9,937,780 B2* | 4/2018 | Murata | B60K 1/04 |
| 10,518,620 B2* | 12/2019 | Yamafuji | B60K 1/04 |
| 10,730,379 B2* | 8/2020 | Tambo | B60L 50/71 |
| 2008/0102345 A1* | 5/2008 | Andreas-Schott | H01M 8/2475 429/511 |
| 2009/0101423 A1* | 4/2009 | Jufuku | H01M 8/04291 429/428 |
| 2011/0294030 A1* | 12/2011 | Yamamoto | H01M 8/247 429/465 |
| 2020/0130517 A1* | 4/2020 | Akiyama | B60L 50/71 |
| 2021/0273253 A1* | 9/2021 | Jilani | H01M 8/04746 |
| 2022/0302543 A1* | 9/2022 | Kim | H01M 50/502 |

* cited by examiner

*Primary Examiner* — Michael L Dignan

(74) *Attorney, Agent, or Firm* — Slater Matsil, LLP

(57) ABSTRACT

An embodiment fuel cell mounting system includes a fuel cell stack enclosure accommodating a fuel cell stack and having a flat structure, a support frame supporting the fuel cell stack enclosure, and a connection system connecting the fuel cell stack enclosure and the support frame, wherein the connection system is configured to elastically restore the fuel cell stack enclosure to a reference position.

10 Claims, 14 Drawing Sheets

FUEL CELL MOUNTING SYSTEM

CROSS-REFERENCE TO RELATED APPLICATIONS

This application claims the benefit of Korean Patent Application No. 10-2020-0167361, filed on Dec. 3, 2020, in the Korean Intellectual Property Office, which application is hereby incorporated herein by reference.

TECHNICAL FIELD

The present disclosure relates to a fuel cell mounting system.

BACKGROUND

A fuel cell is an electrochemical cell that converts the chemical energy of a fuel (hydrogen) and an oxidizing agent (oxygen) into electrical energy through an oxidation-reduction reaction.

As the perception of environmental crisis and depletion of oil resources has increased, eco-friendly vehicles including electric vehicles (EVs) and fuel cell electric vehicles (FCEVs) have risen to prominence. In recent years, the application of fuel cells has been expanded to not only vehicles but also various means of transportation such as trams, urban air mobility (UAM), and purpose-built vehicles (PBVs). Considering diverse customer needs and diversification of the fuel cell industry, research and development of a low profile, full flat fuel cell systems have actively been conducted.

A fuel cell system includes a fuel cell stack generating electrical energy, a fuel process system supplying and processing a fuel (hydrogen) used in the fuel cell stack, an air process system supplying and processing oxygen in the air, which is an oxidizing agent used in the fuel cell stack, and a thermal management system removing reaction heat from the fuel cell stack to the outside of the system and controlling an operating temperature of the fuel cell stack. The fuel cell system generates electricity through an electrochemical reaction between hydrogen as fuel and oxygen in the air, and discharges heat and water as reaction by-products.

A fuel cell system according to the related art has a relatively high profile structure, which makes it difficult to mount the system in various means of transportation such as hydrogen fuel cell vehicles, trams, UAM, and PBVs. For example, some means of transportation (trams, UAM, PBVs, etc.) require a low profile type, in which a height of the fuel cell system is 250 mm or less, due to the limitation of the internal accommodation space.

However, the related art fuel cell system has a relatively high profile structure of 250 mm or greater, so it cannot satisfy the low profile condition.

The above information described in this background section is provided to assist in understanding the background of the inventive concept, and may include any technical concept which is not considered as the prior art that is already known to those skilled in the art.

SUMMARY

The present disclosure relates to a fuel cell mounting system. Particular embodiments relate to a fuel cell mounting system providing a flat fuel cell stack enclosure, thereby allowing a fuel cell system to be a low profile type.

Embodiments of the present disclosure can solve problems occurring in the prior art while advantages achieved by the prior art are maintained intact.

An embodiment of the present disclosure provides a fuel cell mounting system providing a flat fuel cell stack enclosure, thereby allowing a fuel cell system to be a low profile type.

According to an embodiment of the present disclosure, a fuel cell mounting system may include a fuel cell stack enclosure accommodating a fuel cell stack and having a flat structure, a support frame supporting the fuel cell stack enclosure, and a connection system connecting the fuel cell stack enclosure and the support frame. The connection system may elastically restore the fuel cell stack enclosure to a reference position.

The fuel cell stack enclosure may have a first flexible flange and a second flexible flange extending toward the support frame, and the connection system may include a first connection member connecting the first flexible flange and the support frame, and a second connection member connecting the second flexible flange and the support frame.

The first flexible flange and the second flexible flange may be deformed in response to a movement of the fuel cell stack enclosure.

The connection system may include a first biasing member causing the first connection member to be elastically biased toward the reference position, and a second biasing member causing the second connection member to be elastically biased toward the reference position.

The first biasing member and the second biasing member may provide a biasing force in opposite directions.

The first biasing member may provide a biasing force in a direction in which the first connection member is tilted downward.

The second biasing member may provide a biasing force in a direction in which the second connection member is tilted upward.

The connection system may include a shaft mounted on the support frame, the first connection member may include a first body rotatably mounted on the shaft, and a first extension portion extending from the first body, and the second connection member may include a second body rotatably mounted on the shaft, and a second extension portion extending from the second body.

The first extension portion may be connected to the first flexible flange, and the second extension portion may be connected to the second flexible flange.

The fuel cell mounting system may further include a connection bar interposed between the first flexible flange and the second flexible flange.

The first flexible flange and the second flexible flange may be spaced apart from each other in a height direction of the fuel cell stack enclosure.

The reference position may be a position in which a central transverse axis of the fuel cell stack enclosure is parallel to a reference line, and the reference line may be a horizontal line.

A bottom surface of the fuel cell stack enclosure may be located higher than a bottom surface of the support frame by a first distance.

A top surface of the fuel cell stack enclosure may be located lower than a top surface of the support frame by a second distance.

The support frame may surround at least both side edges of the fuel cell stack enclosure.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
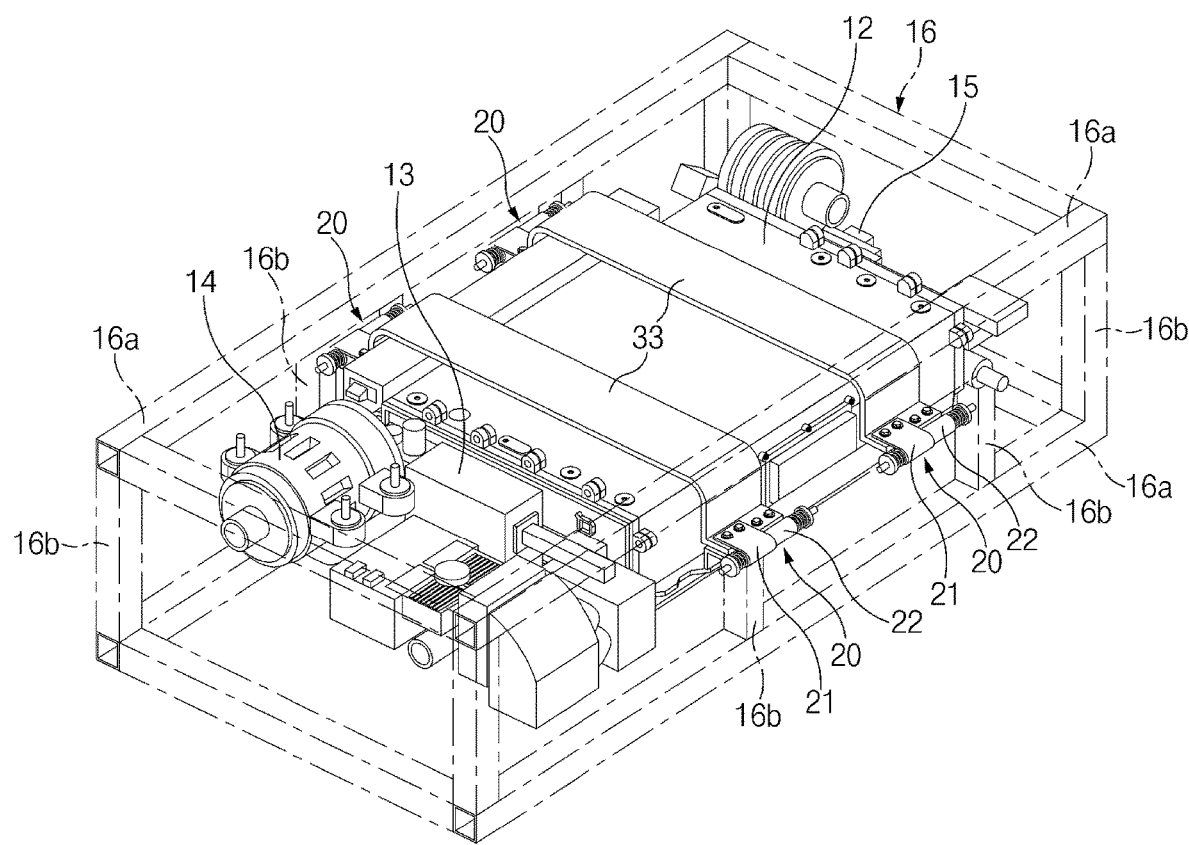
FIG. 1 illustrates a perspective view of a fuel cell system including a fuel cell mounting system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with embodiments of the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a fuel cell system according to an exemplary embodiment of the present disclosure may include a fuel cell stack 11 (see FIG. 7), a fuel cell stack enclosure 12 accommodating the fuel cell stack 11, a fuel process system 13 supplying and processing a fuel (hydrogen) used in the fuel cell stack 11, an air process system 14 supplying and processing oxygen in the air, which is an oxidizing agent used in the fuel cell stack 11, a thermal management system 15 removing reaction heat from the fuel cell stack 11 and controlling an operating temperature of the fuel cell stack 11, and a support frame 16 supporting the fuel cell stack enclosure 12.

Figure 7:
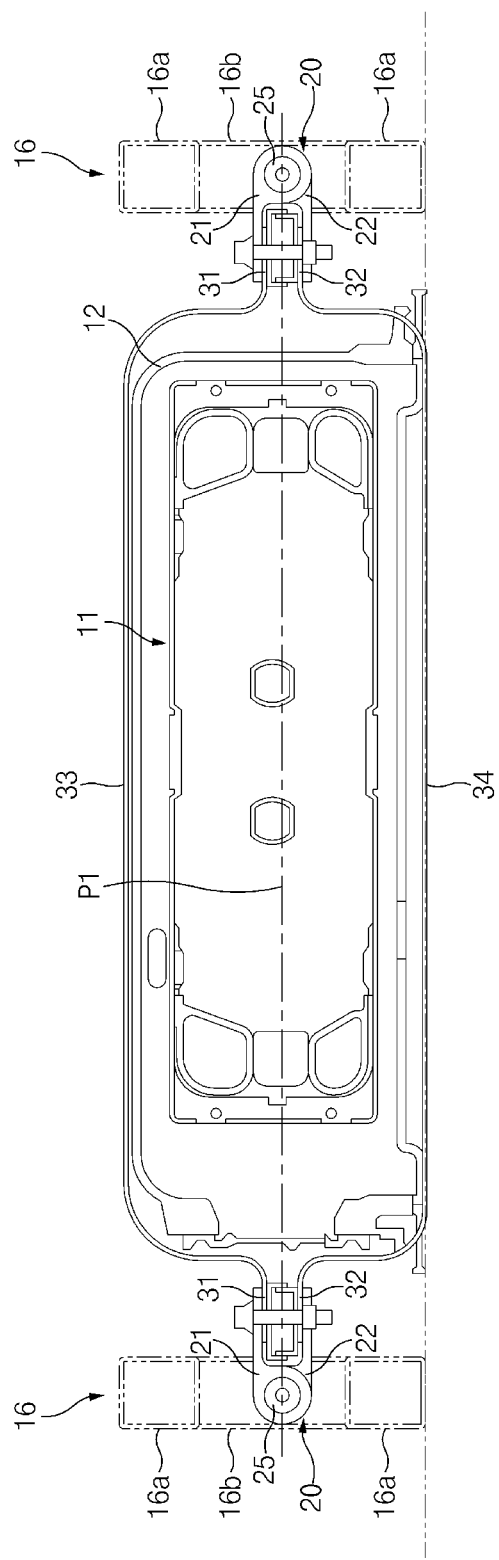
FIG. 7 illustrates a cross-sectional view taken along line C-C of FIG. 3.

Referring to FIG. 7, the fuel cell stack 11 may be disposed in the fuel cell stack enclosure 12, and the fuel cell stack 11 may be protected by the fuel cell stack enclosure 12. The fuel cell stack enclosure 12 may have a low profile, flat structure, whereby the fuel cell system may be easily flattened.

Referring to FIG. 1, the fuel process system 13 may be directly mounted on a front end of the fuel cell stack enclosure 12, and the air process system 14 may be directly mounted on the support frame 16. The thermal management system 15 may be directly mounted on a rear end of the fuel cell stack enclosure 12. The arrangement of the fuel process system 13, the air process system 14, and the thermal management system 15 is not limited to that illustrated in FIG. 1, and may be varied.

The fuel process system 13, the air process system 14, and the thermal management system 15 may be disposed between the periphery of the fuel cell stack enclosure 12 and the support frame 16. In particular, the fuel process system 13, the air process system 14, and the thermal management system 15 may be on the same level as that of the fuel cell stack enclosure 12 in a height direction of the fuel cell stack enclosure 12. Since the fuel process system 13, the air process system 14, and the thermal management system 15 do not protrude above or below the fuel cell stack enclosure 12, the fuel cell system may have a low profile, full flat structure.

Figure 2:
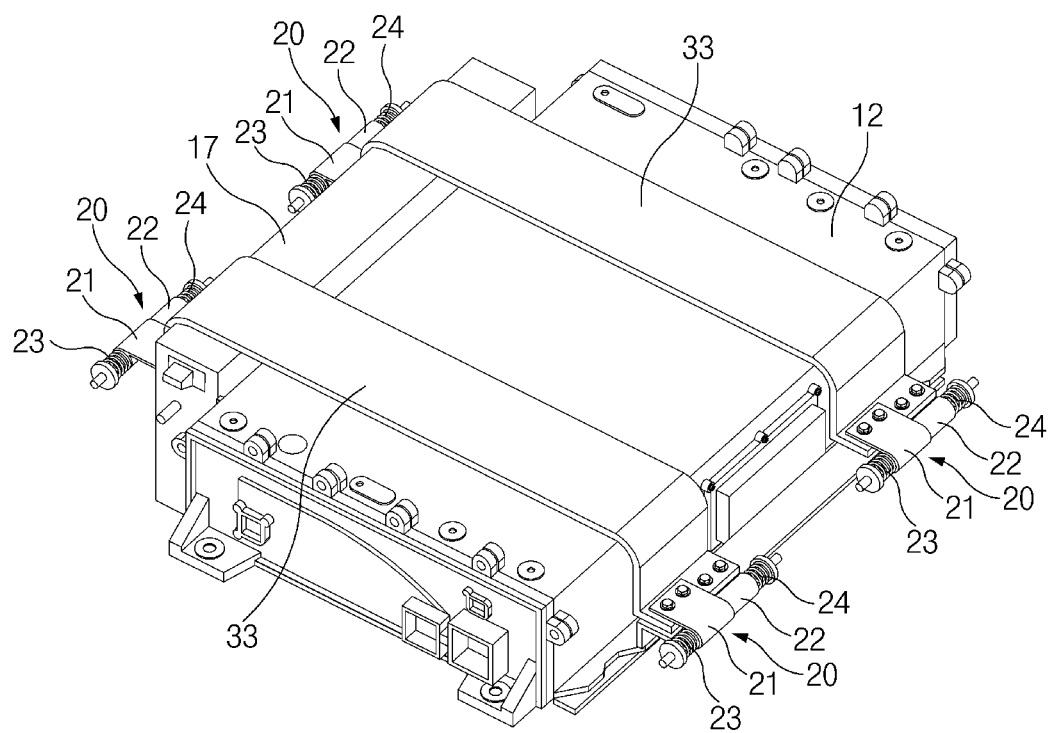
FIG. 2 illustrates a fuel cell stack enclosure and connection systems in the fuel cell mounting system illustrated in FIG. 1.

According to an exemplary embodiment, as illustrated in FIGS. 1 and 2, a high voltage junction box 17 may be attached to one side edge of the fuel cell stack enclosure 12.

Figure 3:
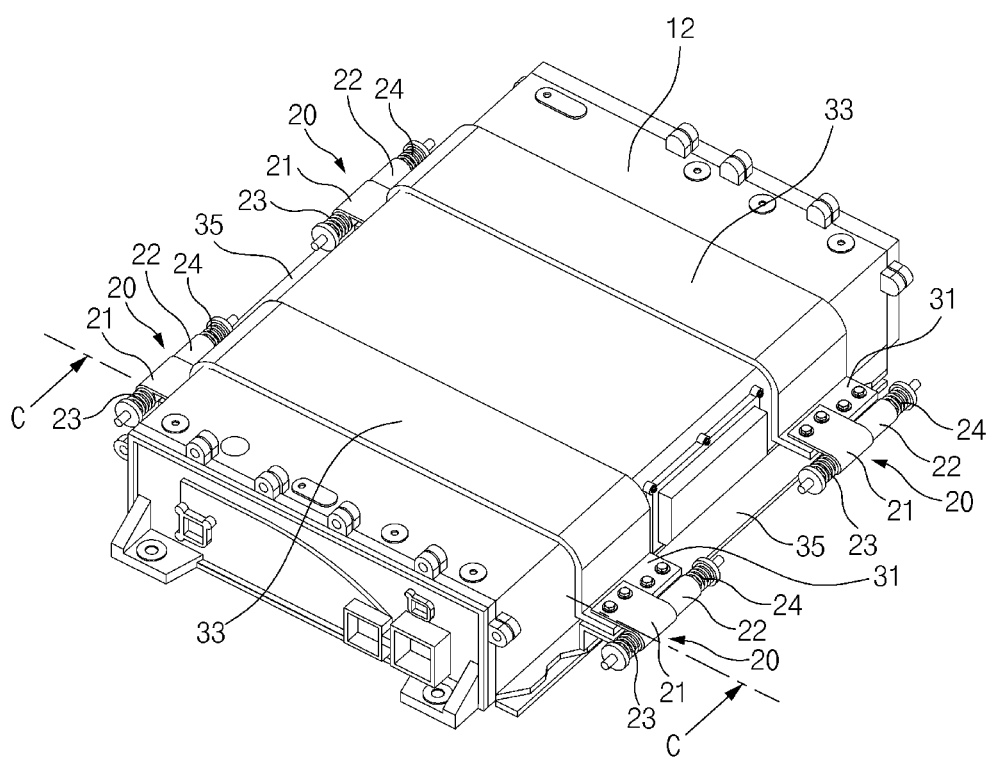
FIG. 3 illustrates a fuel cell stack enclosure and connection systems in a fuel cell mounting system according to another exemplary embodiment of the present disclosure.

According to another exemplary embodiment, as illustrated in FIG. 3, the high voltage junction box may not be attached to an edge of the fuel cell stack enclosure 12, but may be disposed inside the fuel cell stack enclosure 12 or be in a different location.

According to the exemplary embodiment illustrated in FIG. 1, the support frame 16 may surround the fuel cell stack enclosure 12, the fuel process system 13, the air process system 14, and the thermal management system 15. The support frame 16 may include a plurality of horizontal members 16a and a plurality of vertical members 16b, and the plurality of horizontal members 16a and the plurality of vertical members 16b may be at least partially connected to each other.

Referring to FIG. 3, both opposing edges of the fuel cell stack enclosure 12 may be elastically connected to the support frame 16 by a plurality of connection systems 20.

The plurality of connection systems 20 may be symmetrically disposed on both side edges of the fuel cell stack enclosure 12. Referring to FIGS. 2 and 3, two connection systems 20 may be connected to one side edge of the fuel cell stack enclosure 12, and the other two connection systems 20 may be connected to the other side edge of the fuel cell stack enclosure 12.

Each connection system 20 may cause the fuel cell stack enclosure 12 to be elastically biased to a reference position.

Thus, the fuel cell stack enclosure 12 may be maintained in the reference position by the plurality of connection systems 20.

Figure 4:
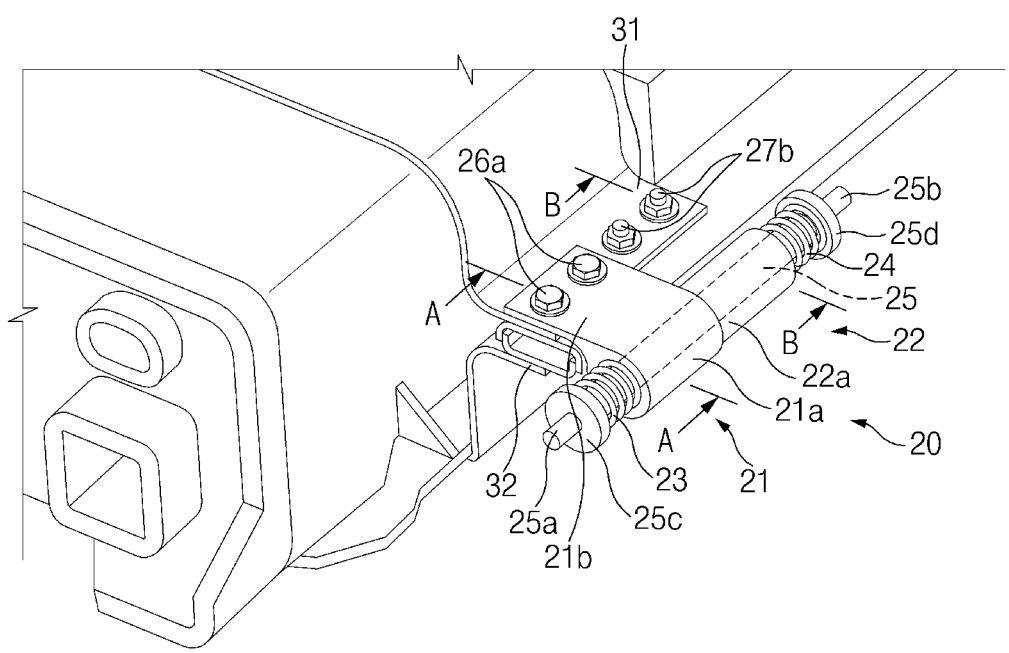
FIG. 4 illustrates an enlarged perspective view of a connection system connected to the fuel cell stack enclosure illustrated in FIG. 3.
Figure 5:
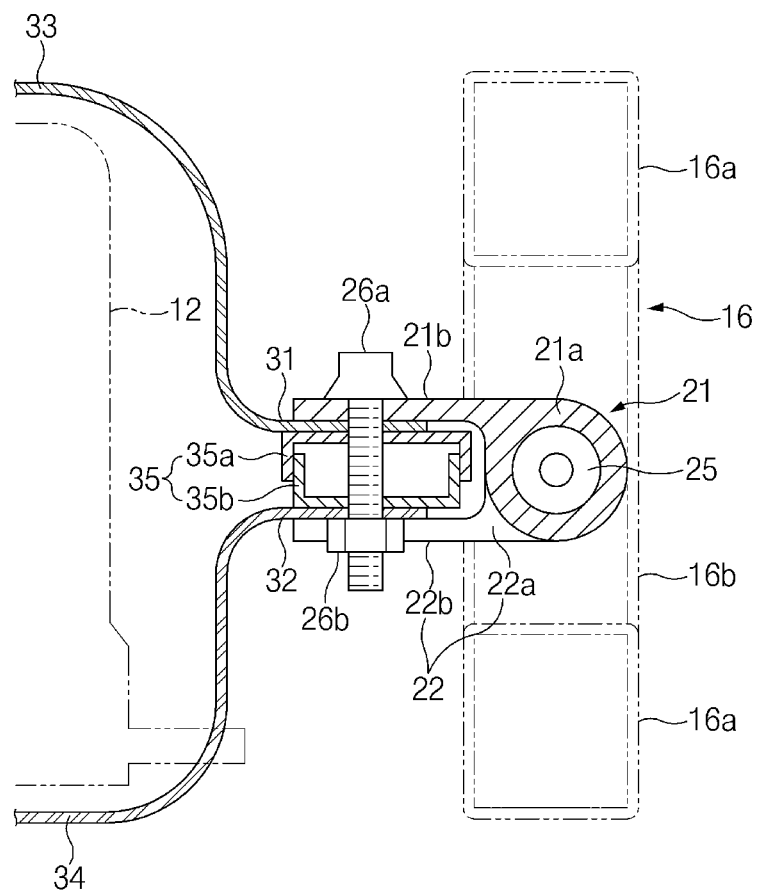
FIG. 5 illustrates a cross-sectional view taken along line A-A of FIG. 4.
Figure 6:
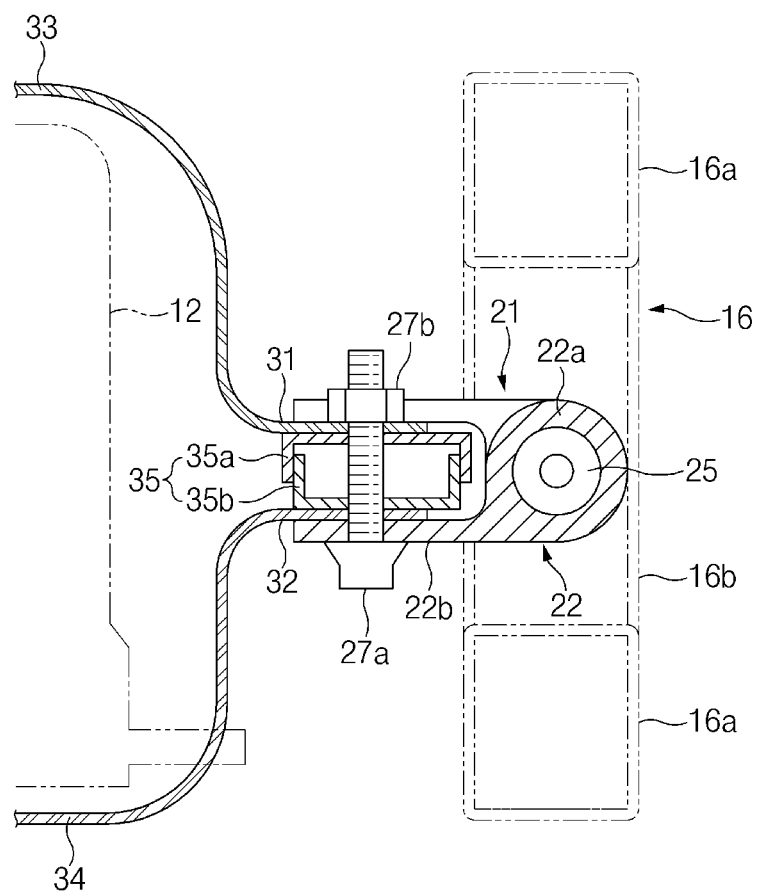
FIG. 6 illustrates a cross-sectional view taken along line B-B of FIG. 4.

Referring to FIGS. 4 to 6, the fuel cell stack enclosure 12 may have a first flexible flange 31 and a second flexible flange 32 extending from the side edge of the fuel cell stack enclosure 12 toward the support frame 16. The first flexible flange 31 may be spaced apart from the second flexible flange 32 in the height direction of the fuel cell stack enclosure 12. The first flexible flange 31 may be located above the second flexible flange 32.

According to an exemplary embodiment, referring to FIGS. 3 and 5-7, a first band 33 may surround an upper portion of the fuel cell stack enclosure 12, and a second band 34 may surround a lower portion of the fuel cell stack enclosure 12. The first flexible flange 31 may extend from each end portion of the first band 33 toward the support frame 16. The second flexible flange 32 may extend from each end portion of the second band 34 toward the support frame 16. Referring to FIG. 2, the first band 33 may surround the upper portion of the fuel cell stack enclosure 12 and an upper portion of the high voltage junction box 17, and the second band 34 may surround the lower portion of the fuel cell stack enclosure 12 and a lower portion of the high voltage junction box 17.

According to another exemplary embodiment, the first flexible flange 31 and the second flexible flange 32 may extend from each side edge of the fuel cell stack enclosure 12. That is, the first flexible flange 31 and the second flexible flange 32 may be directly connected to the side edge of the fuel cell stack enclosure 12, so the first band 33 and the second band 34 may be omitted.

A connection bar 35 may be interposed between the first flexible flange 31 and the second flexible flange 32, and the connection bar 35 may keep a distance between the first flexible flange 31 and the second flexible flange 32. The connection bar 35 may be connected to the first flexible flange 31 and the second flexible flange 32 by fasteners. The connection bar 35 may extend along each side edge of the fuel cell stack enclosure 12. The connection bar 35 may connect the plurality of connection systems 20 mounted on the side edge of the fuel cell stack enclosure 12. In the connection bar 35, an upper bar 35a and a lower bar 35b may be joined by welding and/or the like.

The first flexible flange 31 and the second flexible flange 32 may be formed of a material that may be flexibly deformed. The first flexible flange 31 and the second flexible flange 32 may be deformed in response to a movement of the fuel cell stack enclosure 12 (see FIGS. 8 to 11).

Referring to FIG. 4, each connection system 20 may include a shaft 25. The shaft 25 may have a pair of mounting projections 25a and 25b provided on both ends thereof, and a pair of mounting flanges 25c and 25d adjacent to the pair of mounting projections 25a and 25b, respectively. The mounting projections 25a and 25b of the shaft 25 may be fixed to the support frame 16 so that the shaft 25 may be mounted on the support frame 16.

Each connection system 20 may include a first connection member 21 connecting the shaft 25 and the first flexible flange 31, and a second connection member 22 connecting the shaft 25 and the second flexible flange 32. The first connection member 21 and the second connection member 22 may be arranged in a row in a longitudinal direction of the fuel cell stack enclosure 12.

A portion of the first connection member 21 may be rotatable around the shaft 25, and the other portion of the first connection member 21 may be connected to the first flexible flange 31. Referring to FIG. 5, the first connection member 21 may include a first body 21a having a circular cavity in which the shaft 25 is received, and a first extension portion 21b extending from the first body 21a toward the fuel cell stack enclosure 12. The first extension portion 21b may be attached to a top surface of the first flexible flange 31. The first extension portion 21b may be connected to the first flexible flange 31 and the second flexible flange 32 through first fasteners 26a and 26b. The first fasteners 26a and 26b may be a first bolt 26a and a first nut 26b. The first bolt 26a may pass through the first extension portion 21b of the first connection member 21, the first flexible flange 31, the connection bar 35, and the second flexible flange 32, and the first bolt 26a may be screwed into the first nut 26b on a bottom surface of the second flexible flange 32, and accordingly, the first extension portion 21b of the first connection member 21, the first flexible flange 31, the connection bar 35, and the second flexible flange 32 may be fastened together by the first bolt 26a and the first nut 26b.

A portion of the second connection member 22 may be rotatable around the shaft 25, and the other portion of the second connection member 22 may be connected to the second flexible flange 32. Referring to FIG. 6, the second connection member 22 may include a second body 22a having a circular cavity in which the shaft 25 is received, and a second extension portion 22b extending from the second body 22a toward the fuel cell stack enclosure 12. The second extension portion 22b may be attached to the bottom surface of the second flexible flange 32. The second extension portion 22b may be connected to the first flexible flange 31 and the second flexible flange 32 through second fasteners 27a and 27b. The second fasteners 27a and 27b may be a second bolt 27a and a second nut 27b. The second bolt 27a may pass through the second extension portion 22b of the second connection member 22, the second flexible flange 32, the connection bar 35, and the first flexible flange 31, and the second bolt 27a may be screwed into the second nut 27b on the top surface of the first flexible flange 31, and accordingly, the second extension portion 22b of the second connection member 22, the second flexible flange 32, the connection bar 35, and the first flexible flange 31 may be fastened together by the second bolt 27a and the second nut 27b.

The first extension portion 21b of the first connection member 21 and the second extension portion 22b of the second connection member 22 may be spaced apart from each other in the height direction of the fuel cell stack enclosure 12. The first extension portion 21b of the first connection member 21 may be located above the second extension portion 22b of the second connection member 22.

Referring to FIG. 4, each connection system 20 may include a first biasing member 23 causing the first connection member 21 to be elastically biased toward the reference position, and a second biasing member 24 causing the second connection member 22 to be elastically biased toward the reference position.

Figure 8:
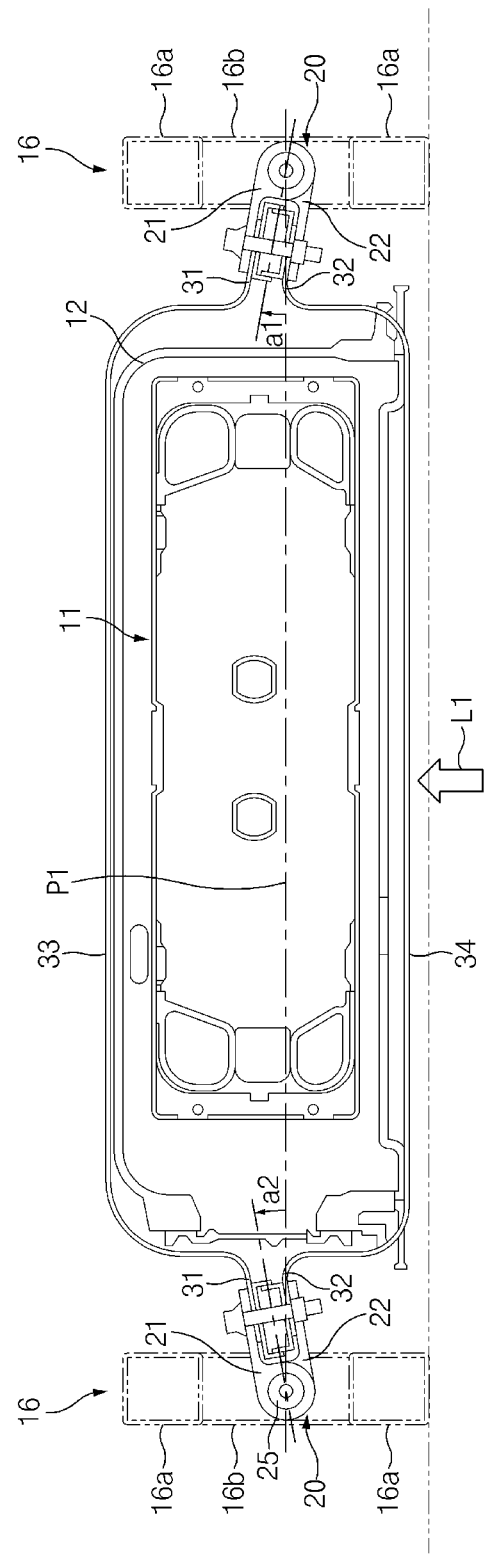
FIG. 8 illustrates a state in which a vertical load acts on a fuel cell stack enclosure from bottom to top.
Figure 10:
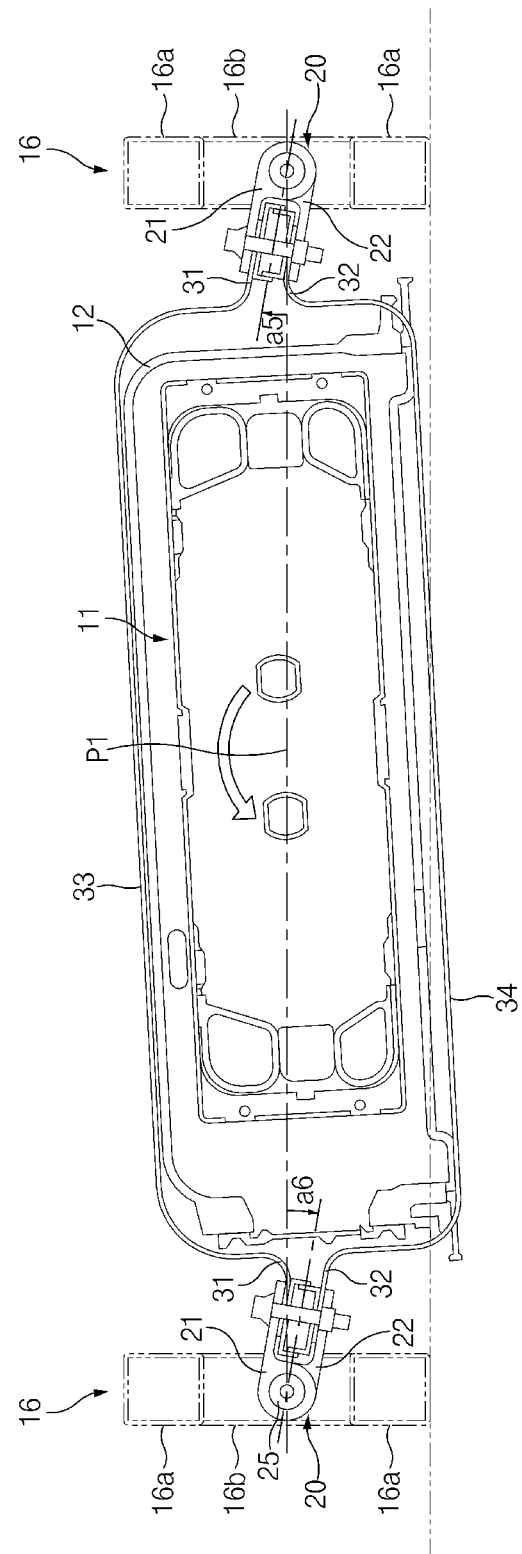
FIG. 10 illustrates a state in which a moment load acts on a fuel cell stack enclosure in a counterclockwise direction.
Figure 11:
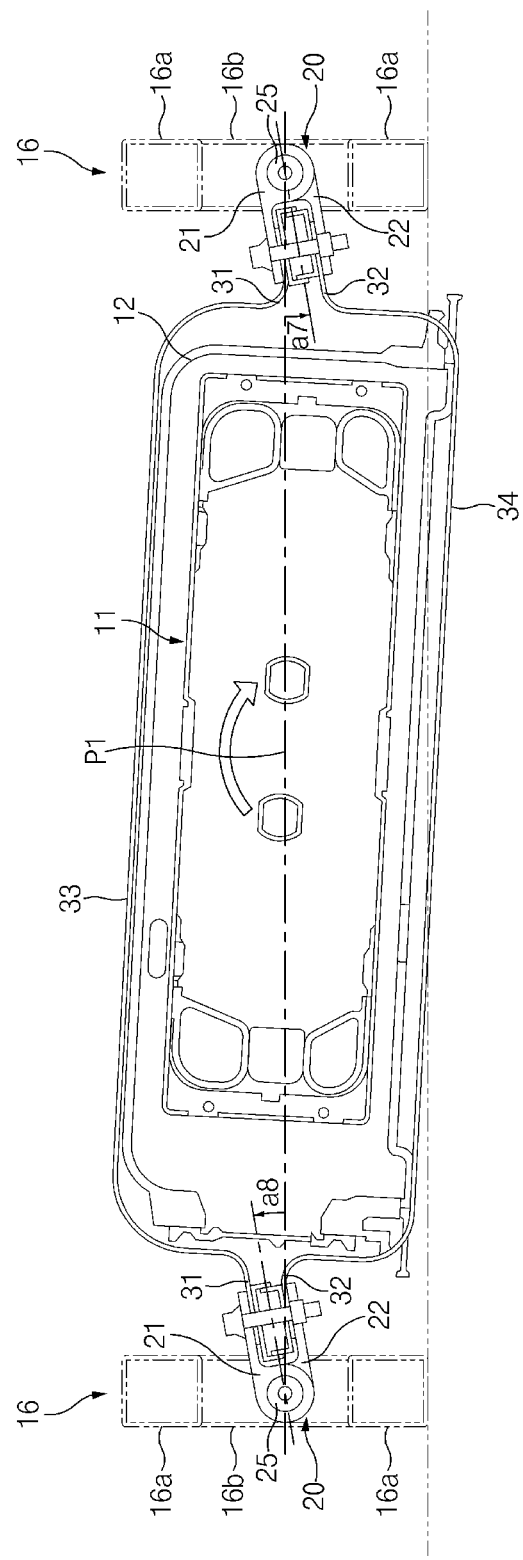
FIG. 11 illustrates a state in which a moment load acts on a fuel cell stack enclosure in a clockwise direction.

The first biasing member 23 may be a torsion spring disposed between the first mounting flange 25c of the shaft 25 and the first connection member 21, and the first biasing member 23 may have a pair of support legs which are supported to the first mounting flange 25c and the first connection member 21, respectively. As illustrated in FIGS. 8, 10, and 11, when the first connection member 21 is tilted upward by a predetermined angle (see a1 and a2 in FIG. 8, a5 in FIG. 10, and a8 in FIG. 11) from the reference position due to an external impact, the first biasing member 23 may provide a biasing force in the opposite direction with respect to the tilting of the first connection member 21 so as to restore the first connection member 21 to the reference position. Specifically, the first biasing member 23 may provide the biasing force in a direction in which the first connection member 21 is tilted downward. Even if the first connection member 21 is moved by the external impact, the biasing force of the first biasing member 23 may cancel out the impact so that the first connection member 21 may be restored to the reference position, and thus the first flexible flange 31 and the second flexible flange 32 may be restored to the reference position.

Figure 9:
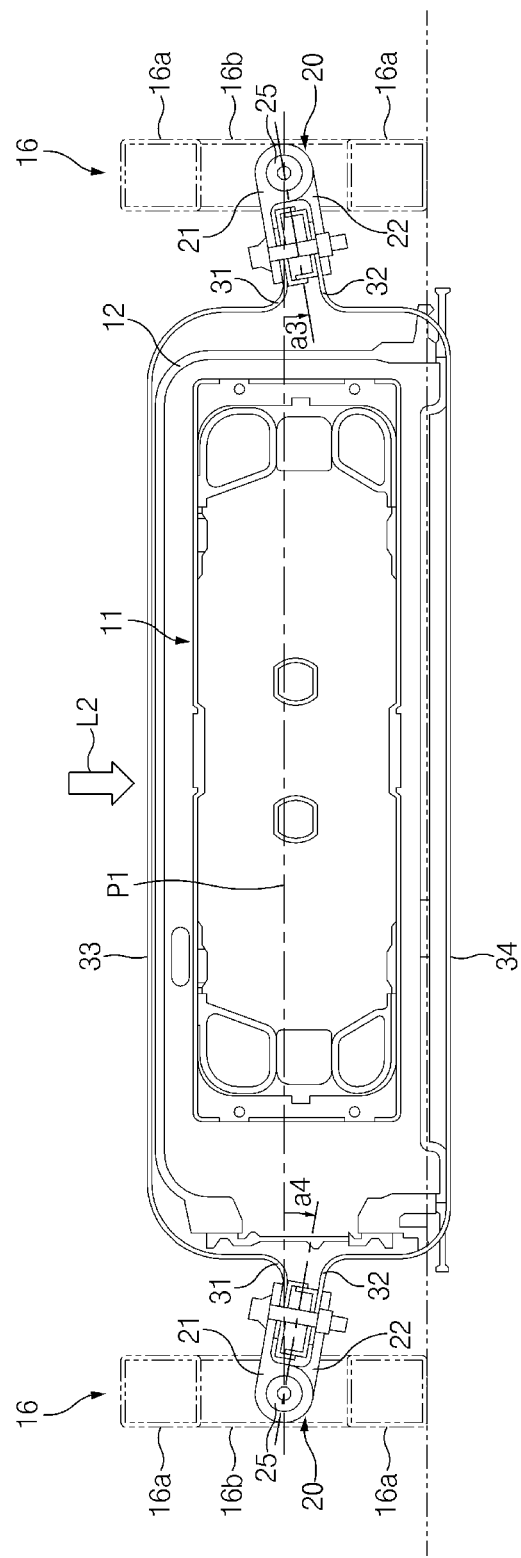
FIG. 9 illustrates a state in which a vertical load acts on a fuel cell stack enclosure from top to bottom.

The second biasing member 24 may be a torsion spring disposed between the second mounting flange 25*d* of the shaft 25 and the second connection member 22, and the second biasing member 24 may have a pair of support legs which are supported to the second mounting flange 25*d* and the second connection member 22, respectively. As illustrated in FIGS. 9, 10, and 11, when the second connection member 22 is tilted downward by a predetermined angle (see a3 and a4 in FIG. 9, a6 in FIG. 10, and a7 in FIG. 11) from the reference position due to an external impact, the second biasing member 24 may provide a biasing force in the opposite direction with respect to the tilting of the second connection member 22 so as to restore the second connection member 22 to the reference position. Specifically, the second biasing member 24 may provide the biasing force in a direction in which the second connection member 22 is tilted upward. Even if the second connection member 22 is moved by the external impact, the biasing force of the second biasing member 24 may cancel out the impact so that the second connection member 22 may be restored to the reference position, and thus the second flexible flange 32 and the first flexible flange 31 may be restored to the reference position.

As described above, the first biasing member 23 may provide the biasing force in a direction in which the first connection member 21 is tilted downward, and the second biasing member 24 may provide the biasing force in a direction in which the second connection member 22 is tilted upward. That is, the first biasing member 23 and the second biasing member 24 may provide the biasing force in the opposite directions.

Referring to FIG. 7, when an external load is not applied to the fuel cell stack enclosure 12, the fuel cell stack enclosure 12 may be in the reference position. Here, the reference position may refer to a position in which a central transverse axis of the fuel cell stack enclosure 12 is aligned with or parallel to a reference line P1. The reference line P1 may be a virtual line (horizontal line) that virtually connects the center of the shaft 25 of the left connection system 20 and the center of the shaft 25 of the right connection system 20. When the fuel cell stack enclosure 12 is in the reference position, the first extension portion 21*b* of the first connection member 21 and the second extension portion 22*b* of the second connection member 22 may be parallel to top and bottom surfaces of the fuel cell stack enclosure 12. In FIGS. 7 to 11, the reference position may be a horizontal position.

As illustrated in FIGS. 8 to 11, when the fuel cell stack enclosure 12 is moved by external loads L1, L2, M1, and M2, the fuel cell stack enclosure 12 may be restored to the reference position by the connection systems 20.

Referring to FIG. 8, when a vertical load L1 generated by an external impact acts on the fuel cell stack enclosure 12 from bottom to top, the fuel cell stack enclosure 12 may be moved upward, and accordingly, the first connection member 21 and the second connection member 22 of the left connection system 20 may be tilted upward by a predetermined angle a1 from the reference line P1, and the first connecting member 21 and the second connecting member 22 of the right connecting system 20 may be tilted upward by a predetermined angle a2 from the reference line P1. Here, the first biasing member 23 of the left connection system 20 may apply a biasing force in a direction in which the first connection member 21 of the left connection system 20 is tilted downward, and the first biasing member 23 of the right connection system 20 may apply a biasing force in a direction in which the first connection member 21 of the right connection system 20 is tilted downward, and accordingly, the vertical load L1 applied to the fuel cell stack enclosure 12 may be cancelled out. Thus, the fuel cell stack enclosure 12 may be restored to the reference position.

Referring to FIG. 9, when a vertical load L2 generated by an external impact acts on the fuel cell stack enclosure 12 from top to bottom, the fuel cell stack enclosure 12 may be moved downward, and accordingly, the first connection member 21 and the second connection member 22 of the left connection system 20 may be tilted downward by a predetermined angle a3 from the reference line P1, and the first connection member 21 and the second connection member 22 of the right connection system 20 may be tilted downward by a predetermined angle a4 from the reference line P1. Here, the first biasing member 23 of the left connection system 20 may apply a biasing force in a direction in which the first connection member 21 of the left connection system 20 is tilted upward, and the first biasing member 23 of the right connection system 20 may apply a biasing force in a direction in which the first connection member 21 of the right connection system 20 is tilted upward, and accordingly, the vertical load L2 applied to the fuel cell stack enclosure 12 may be cancelled out. Thus, the fuel cell stack enclosure 12 may be restored to the reference position.

Referring to FIG. 10, when a moment load M1 generated by an external impact acts on the fuel cell stack enclosure 12 in a counterclockwise direction, the fuel cell stack enclosure 12 may be twisted (tilted) to the left in response to the moment load M1. Accordingly, the first connection member 21 and the second connection member 22 of the left connection system 20 may be tilted upward by a predetermined angle a5 from the reference line P1, and the first connection member 21 and the second connection member 22 of the right connection system 20 may be tilted downward by a predetermined angle a6 from the reference line P1. Here, the first biasing member 23 of the left connection system 20 may apply a biasing force in a direction in which the first connection member 21 of the left connection system 20 is tilted downward, and the first biasing member 23 of the right connection system 20 may apply a biasing force in a direction in which the first connection member 21 of the right connection system 20 is tilted upward, and accordingly, the moment load M1 applied to the fuel cell stack enclosure 12 may be cancelled out. Thus, the fuel cell stack enclosure 12 may be restored to the reference position.

Referring to FIG. 11, when a moment load M2 generated by an external impact acts on the fuel cell stack enclosure 12 in a clockwise direction, the fuel cell stack enclosure 12 may be twisted (tilted) to the right in response to the moment load M2. Accordingly, the first connection member 21 and the second connection member 22 of the left connection system 20 may be tilted downward by a predetermined angle a7 from the reference line P1, and the first connection member 21 and the second connection member 22 of the right connection system 20 may be tilted upward by a predetermined angle a8 from the reference line P1. Here, the first biasing member 23 of the left connection system 20 may apply a biasing force in a direction in which the first connection member 21 of the left connection system 20 is tilted upward, and the first biasing member 23 of the right connection system 20 may apply a biasing force in a direction in which the first connection member 21 of the right connection system 20 is tilted downward, and accordingly, the moment load M2 applied to the fuel cell stack enclosure 12 may be cancelled out. Thus, the fuel cell stack enclosure 12 may be restored to the reference position.

Referring to FIGS. 1 to 3, two left connection systems 20 may be disposed on the left side of the fuel cell stack enclosure 12, and two right connection systems 20 may be disposed on the right side of the fuel cell stack enclosure 12. That is, a total of four connection systems 20 may be symmetrically arranged on both the left and right sides of the fuel cell stack enclosure 12. This arrangement may allow the external impact to be cancelled out or absorbed when the external impact is applied to the fuel cell stack enclosure 12 in various directions, and thus the fuel cell stack enclosure 12 may be stably restored to the reference position.

Figure 12:
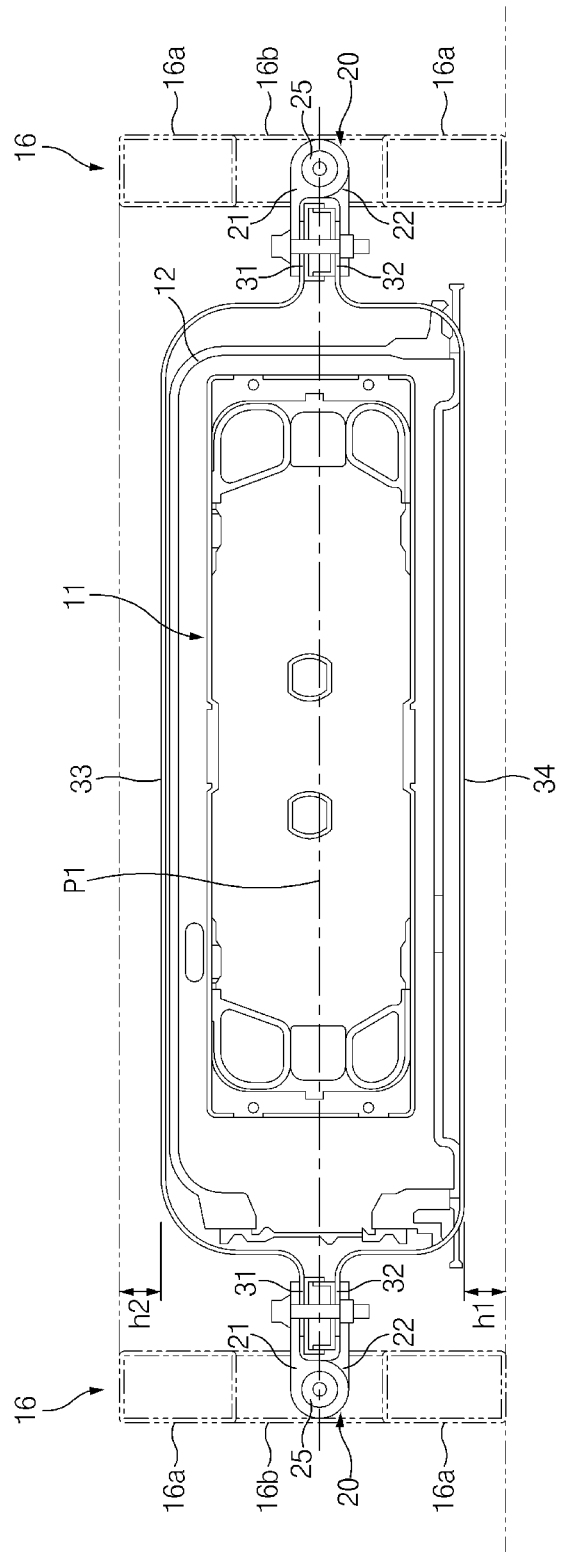
FIG. 12 illustrates a fuel cell stack enclosure and a support frame according to another exemplary embodiment of the present disclosure.

Referring to FIG. 12, when the fuel cell stack enclosure 12 is in the reference position, the bottom surface of the fuel cell stack enclosure 12 may be located higher than a bottom surface of the support frame 16 by a first distance h1. For example, the first distance h1 may be 45 mm. The top surface of the fuel cell stack enclosure 12 may be located lower than a top surface of the support frame 16 by a second distance h2. For example, the second distance h2 may be 45 mm. Accordingly, sufficient space may be provided under the bottom surface of the fuel cell stack enclosure 12 and above the top surface of the fuel cell stack enclosure 12. Thus, even if the fuel cell stack enclosure 12 is moved by the external impact, the fuel cell stack enclosure 12 may be prevented from protruding from an upper end of the support frame 16 or contacting a bottom of the fuel cell system, therefore the fuel cell stack enclosure 12 may be prevented from interfering with an external component or having a secondary collision with an external component.

Figure 13:
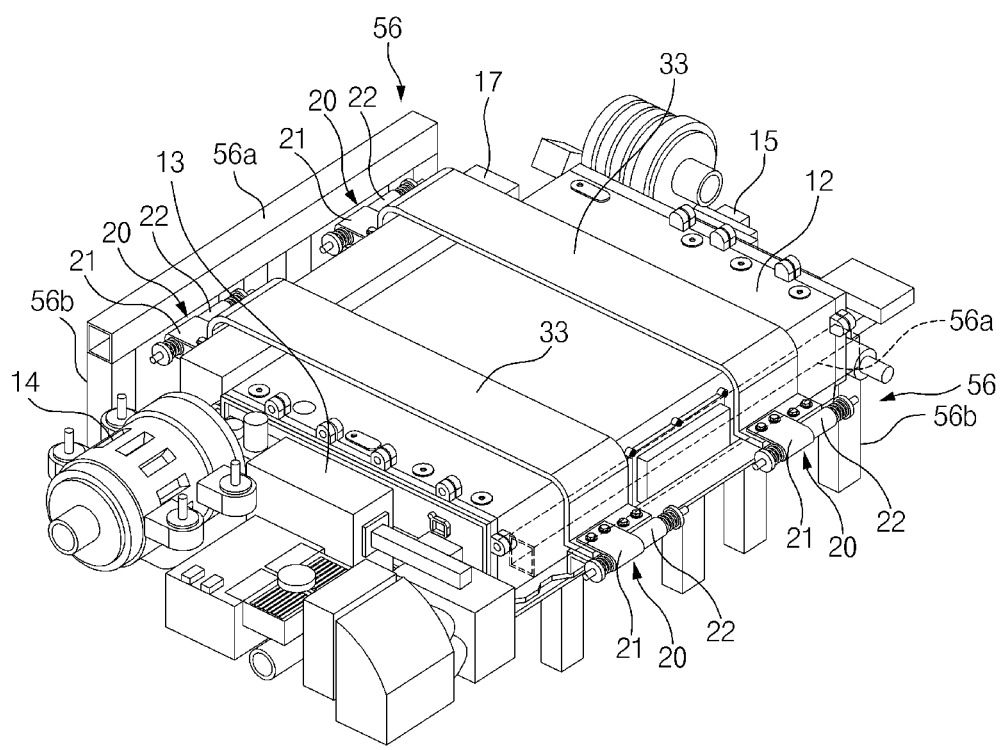
FIG. 13 illustrates a perspective view of a fuel cell system including a fuel cell mounting system according to another exemplary embodiment of the present disclosure.

FIG. 13 illustrates a fuel cell system including a fuel cell mounting system according to another exemplary embodiment of the present disclosure. Referring to FIG. 13, a support frame may include a pair of support structures 56 disposed on both sides of the fuel cell stack enclosure 12, respectively. The pair of support structures 56 may surround both side edges of the fuel cell stack enclosure 12. Each support structure 56 may include a longitudinal member 56a extending in the longitudinal direction of the fuel cell stack enclosure 12 and a plurality of vertical members 56b supporting the longitudinal member 56a. The shaft 25 of each connection system 20 may be mounted between two adjacent vertical members 56b.

Since the other configurations of the fuel cell system are the same as or similar to those in the previous exemplary embodiments, a detailed description thereof will be omitted.

Figure 14:
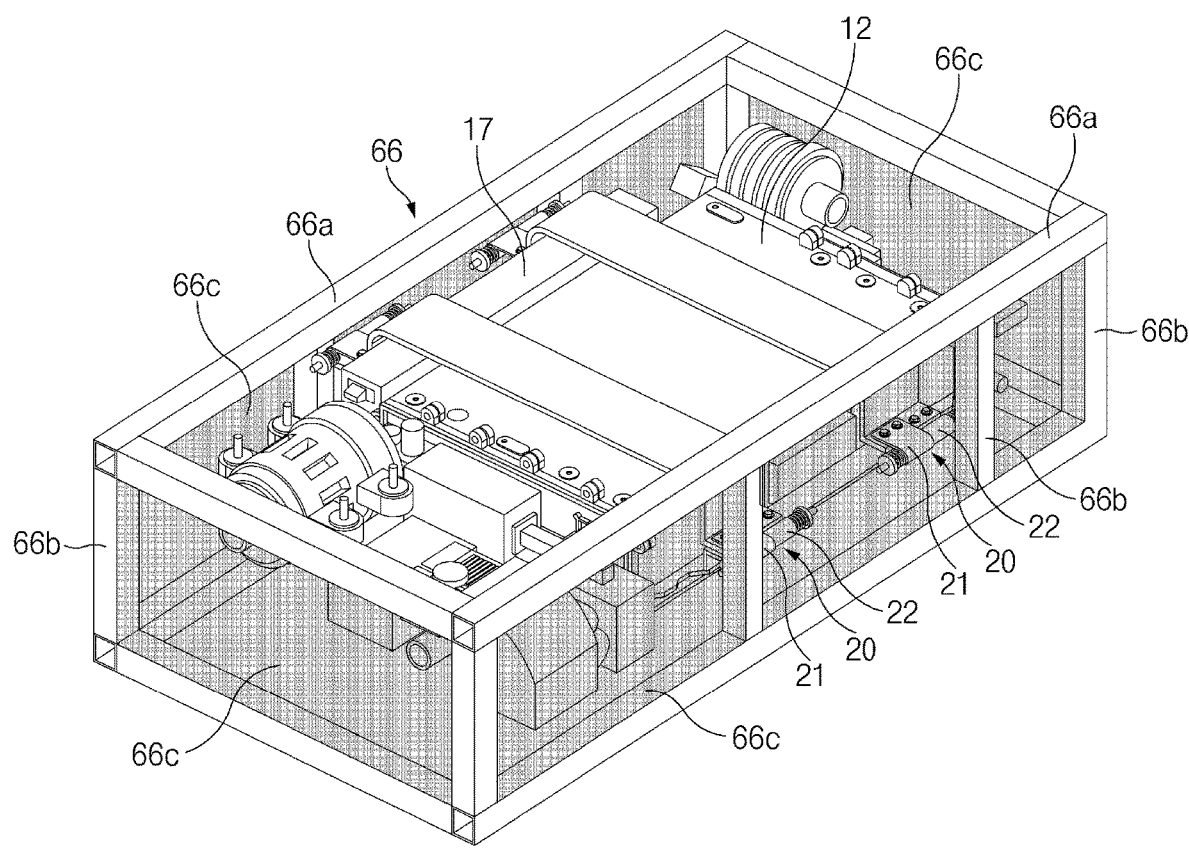
FIG. 14 illustrates a perspective view of a fuel cell system including a fuel cell mounting system according to another exemplary embodiment of the present disclosure.

FIG. 14 illustrates a fuel cell system including a fuel cell mounting system according to another exemplary embodiment of the present disclosure. Referring to FIG. 14, a support frame 66 may surround the fuel cell stack enclosure 12, the fuel process system 13, the air process system 14, and the thermal management system 15. The support frame 66 may include a plurality of horizontal members 66a, a plurality of vertical members 66b, and a plurality of closed walls 66c. The plurality of horizontal members 16a and the plurality of vertical members 16b may be at least partially connected to each other, and the plurality of closed walls 66c may face the front, rear, left side and right side of the fuel cell stack enclosure 12.

As set forth above, according to exemplary embodiments of the present disclosure, as the fuel cell stack enclosure 12 is elastically restored to the reference position by the plurality of connection systems 20, the fuel cell stack enclosure 12 may be a low profile, flat structure having a relatively low thickness (for example, 250 mm or less). Thus, the full flat structure of the fuel cell system may be achieved.

According to exemplary embodiments of the present disclosure, by reliably canceling out or absorbing the external impact even when the external impact is applied to the fuel cell stack enclosure in various directions, the fuel cell stack enclosure may be stably restored to the reference position.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A fuel cell mounting system comprising:
   a fuel cell stack enclosure accommodating a fuel cell stack and having a flat structure, the fuel cell stack enclosure including a first flexible flange and a second flexible flange;
   a support frame supporting the fuel cell stack enclosure, wherein the support frame comprises a plurality of horizontal members and a plurality of vertical members and wherein the first flexible flange and the second flexible flange extend toward the support frame; and
   a connection system connecting the fuel cell stack enclosure and a vertical center of at least one of the vertical members of the support frame, wherein the connection system is configured to elastically restore the fuel cell stack enclosure to a reference position, and wherein the connection system comprises:
      a band that extends from the at least one vertical member on one side of the fuel cell stack enclosure to an opposite side of the fuel cell stack enclosure;
      a shaft mounted on the vertical center of the at least one of the vertical members of the support frame;
      a first connection member comprising a first body rotatably mounted on the shaft, the first connection member extending in a horizontal direction to connect the first flexible flange and the support frame;
      a second connection member comprising a second body rotatably mounted on the shaft, the second connection member extending in a horizontal direction to connect the second flexible flange and the support frame;
      a first biasing member configured to cause the first connection member to be elastically biased toward the reference position; and
      a second biasing member configured to cause the second connection member to be elastically biased toward the reference position.

2. The fuel cell mounting system according to claim 1, wherein the first biasing member and the second biasing member are configured to provide a biasing force in opposite directions.

3. The fuel cell mounting system according to claim 1, wherein the first biasing member is configured to provide a biasing force in a direction in which the first connection member is tilted downward.

4. The fuel cell mounting system according to claim 1, wherein the second biasing member is configured to provide a biasing force in a direction in which the second connection member is tilted upward.

5. The fuel cell mounting system according to claim 1, further comprising a connection bar interposed between the first flexible flange and the second flexible flange.

6. The fuel cell mounting system according to claim 1, wherein the first flexible flange and the second flexible flange are spaced apart from each other in a height direction of the fuel cell stack enclosure.

7. The fuel cell mounting system according to claim 1, wherein:
the reference position is a position in which a central transverse axis of the fuel cell stack enclosure is parallel to a reference line; and
the reference line is a horizontal line.

8. The fuel cell mounting system according to claim 1, wherein a bottom surface of the fuel cell stack enclosure is located higher than a bottom surface of the support frame by a first distance.

9. The fuel cell mounting system according to claim 1, wherein a top surface of the fuel cell stack enclosure is located lower than a top surface of the support frame by a second distance.

10. The fuel cell mounting system according to claim 1, wherein the horizontal members extend along a length of the fuel cell stack enclosure and the vertical members extend along a height of the fuel cell stack enclosure.

\* \* \* \* \*